K. W. BARTLETT & J. J. STALEY.
APPARATUS FOR GAS ANALYSIS.
APPLICATION FILED NOV. 7, 1908.
945,740.  Patented Jan. 11, 1910.
3 SHEETS—SHEET 3.
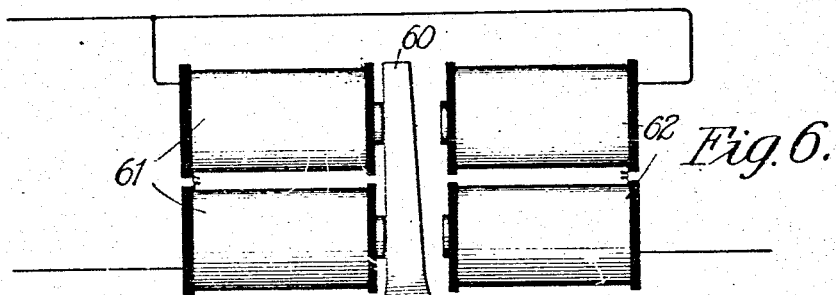
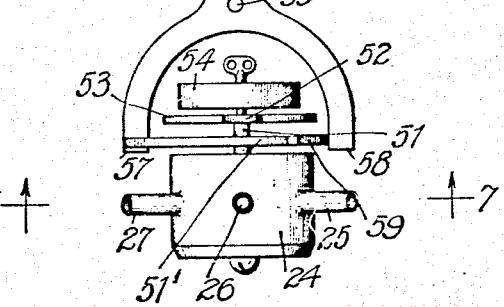
Witnesses:
Frank J Thelen
George C. Higham
Inventors
Kent W. Bartlett
Judson J. Staley
By Brown Williams
Attorneys

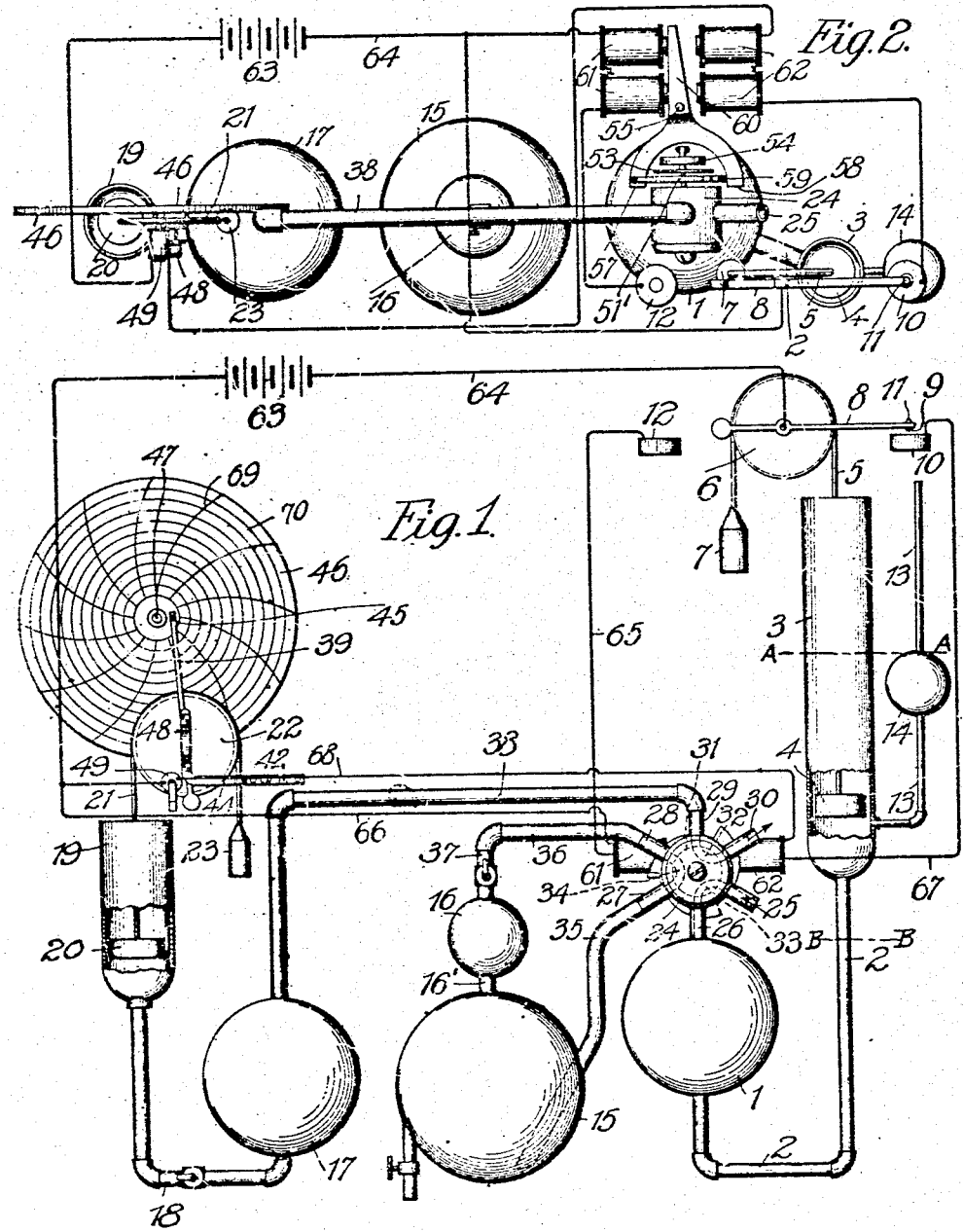

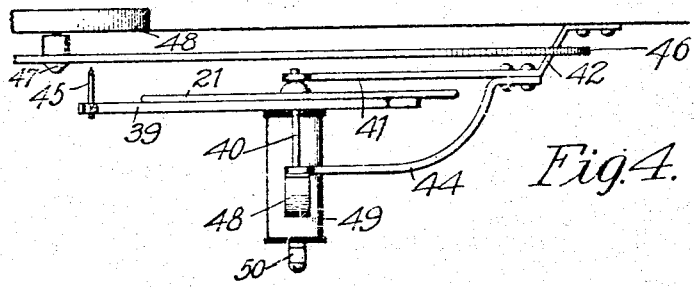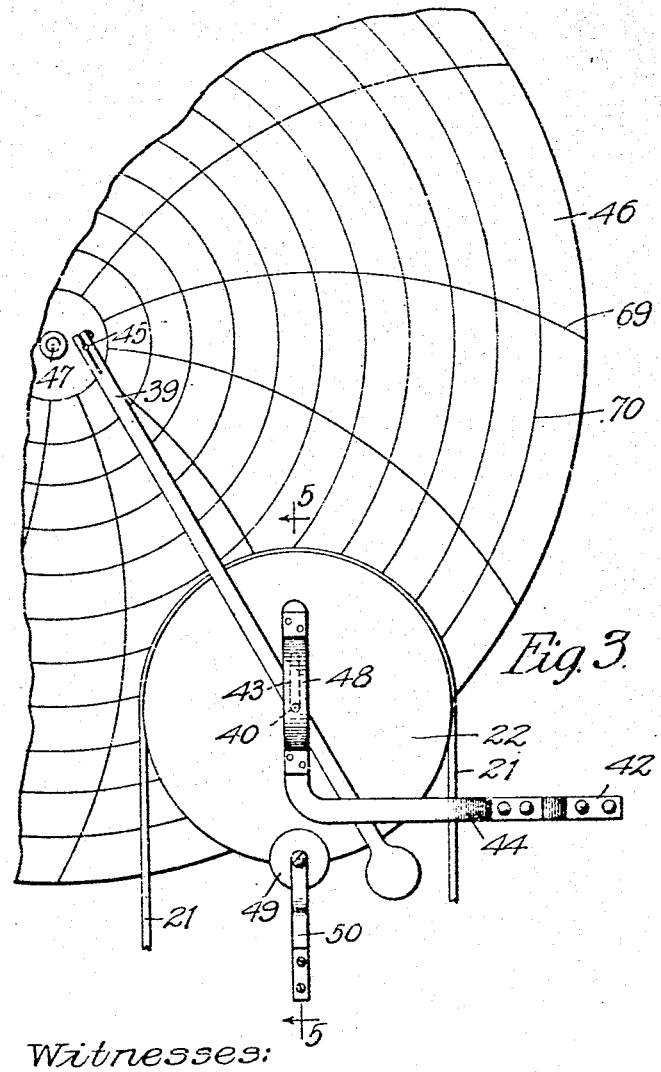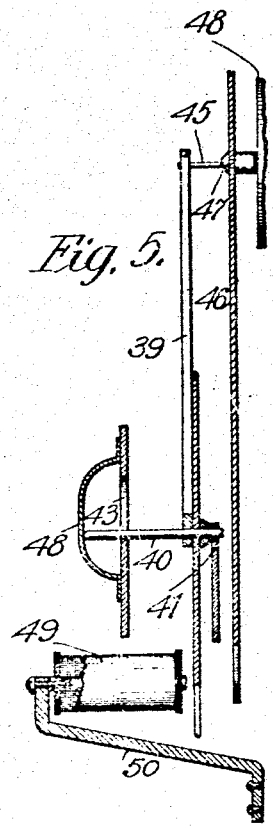

UNITED STATES PATENT OFFICE.

KENT W. BARTLETT AND JUDSON J. STALEY, OF MADISON, WISCONSIN, ASSIGNORS TO NORTHERN WATER SOFTENER COMPANY, OF MADISON, WISCONSIN, A CORPORATION OF MAINE.

APPARATUS FOR GAS ANALYSIS.

945,740. Specification of Letters Patent. Patented Jan. 11, 1910.

Application filed November 7, 1908. Serial No. 461,449.

*To all whom it may concern:*

Be it known that we, KENT W. BARTLETT, and JUDSON J. STALEY, citizens of the United States, residing at Madison, in the county of Dane and State of Wisconsin, having invented a certain new and useful Improvement in Apparatus for Gas Analysis, of which the following is a full, clear, concise, and exact description, reference being had to the accompanying drawings, forming a part of this specification.

Our invention relates to apparatus for gas analyzing and has for its object improved arrangement which will automatically and continuously analyze gas and record the analysis.

In prior arrangements for testing flue gas a plurality of more or less complicated steps are necessary in order to obtain correct analysis. In our improved arrangement all the various steps are automatically performed, the operation being entirely automatic and continuous, the results of the analysis being indicated or printed.

In the accompanying drawings, which clearly show our improved arrangement Figure 1 is an elevation view of the various analysis mechanisms. Fig. 2 is a top view of the apparatus shown in Fig. 1. Fig. 3 is an enlarged view of part of the record chart and the marking member controlling mechanism. Fig. 4 is a top view of the parts shown in Fig. 3. Fig. 5 is a sectional view taken on line 5, 5 of Fig. 3. Fig. 6 is an enlarged view of the electro-magnetic valve controlling mechanism; and Fig. 7 is a view taken on plane 7, 7 of Fig. 6.

We shall first describe the various mechanisms and recording members and then the operation and coöperation thereof to analyze flue gas.

Referring first to Fig. 1, 1 represents a receptacle which connects through the pipe 2 with the lower end of a cylindrical reservoir 3. In this reservoir is a float member 4, from which a cord 5 extends upwardly and about a pulley 6 and terminates at its other end in a weight 7. Pivoted to rotate with the pulley 6 is a contact arm 8 having a contact point 9. The weight of the float member 4 being greater than that of the weight 7, the float will normally be down and the contact point 9 in engagement with a terminal 10. The arm 8 also has a contact point 11, and this contact point, when the weight 7 falls, is carried around into engagement with the contact member 12. Therefore, as the float rises and falls in the reservoir 3 the contact arm 8 swings from one contact member to the other. Tapping the reservoir 3 at a point below the float is a pipe 13 which extends upwardly level with the top of the reservoir and which contains a sub-reservoir 14. 15 represents a separating reservoir connected through pipe 16' with a drying reservoir 16. 17 represents another reservoir which is connected through pipe 18 with the lower end of the measuring reservoir 19. In this reservoir 19 is a plunger 20, from which a cord 21 extends and passes over a pulley 22, terminating at its other end in a weight 23. 24 represents a cylindrical valve frame or shell having six connecting ends, 25, 26, 27, 28, 29 and 30, spaced 60 degrees apart. Within the valve is the valve plug 31 having three valve passageways, 32, 33 and 34 whose outlets are spaced 60 degrees in order that each space may connect with two adjacent outlets. Connecting end 25 is connected with a source of flue gas, this gas being preferably delivered under pressure. Connecting member 26 connects with the top of reservoir 1. Connecting end 27 connects through pipe 35 which leads to the bottom of the reservoir 15. Connecting end 28 connects through pipe 36 with the upper end of the drying reservoir 16, a valve 37 being shown as interposed in said pipe. Connecting end 29 connects through pipe 38 with the top of reservoir 17 and the end 30 connects with atmosphere. The various reservoirs which we have mentioned can be in the form of glass bulbs and the measuring reservoirs can be in the form of glass tubes. The piping connecting the various members can also be in the form of glass tubing, and in this piping drain cocks or valves can be inserted as desired.

Referring particularly to Figs. 3, 4 and 5, we have shown a recording needle 39 pivoted to rotate with the pulley 22. As shown, the pulley and needle are mounted on a spindle 40 which at its rear end pivots in the end of bar 41 extending from the supporting frame 42 and whose other end passes through a vertical slot 43 formed in the end of bar 44 also extending from the supporting frame 42. At the end of the needle is carried a marking point 45 which is normally out of contact with the dial 46, pivoted centrally at 47, and which is connected with clock work 48 to be rotated. When the lower edge of the pulley 22 is moved forward and the pulley tilted, the marking point will engage the record chart. This tilting of the pulley is allowed by virtue of the engagement of the forward end of the spindle in the vertical slot 43. The spindle is confined in its bearings by a cap plate 48, as best shown at Fig. 5. The pulley 22 is of magnetic material, and disposed in front of its lower edge is an electro-magnet 49, which upon energization will attract the pulley at its lower edge and will cause tilting thereof and engagement of the needle marking point with the record chart. The electro-magnet is supported in some suitable way as from a bracket 50.

In Figs. 6 and 7 is shown the mechanism for controlling the operation of the valve 31. The valve plug is mounted on a shaft 51, which also mounts an escapement wheel 51' and a driving pinion 52, this driving pinion being engaged by a gearing 53 driven by clock mechanism 54. Pivoted at 55 is an escapement frame 56, whose escapement ends 57 and 58 coöperate with the escapement teeth 59 of the escapement wheel, these escapement teeth being three in number. Supported by the escapement frame is an armature 60 which extends between electro-magnet sets 61 and 62 to be attracted first by one and then by the other.

When analysis is to be made, the receptacle 1 is filled with some liquid which will not evaporate, the pipe 2 being filled to the line B—B and the reservoir 3 being empty. The receptacle 15 is filled with some liquid, such as caustic potash, which will absorb carbon dioxid. The reservoir 17 and the pipe 18 are also filled with some liquid and the measuring reservoir 19 is normally empty with the float at the bottom thereof and the indicating needle is in front of the zero position of the chart. The flue gas is directed under pressure to the connecting end 25 of the valve structure. The valve being normally in position as shown in Fig. 1, this gas will flow into the top of reservoir 1 and will force the liquid in said reservoir downwardly, which will cause liquid to flow into the reservoir 3, the liquid rising slowly in the reservoir 3 until the sub-reservoir 14 has been filled, and the liquid is at the level indicated by the line A—A, the float 4 thereby being raised. The pulley 6 will be rotated and the contact point 11 on arm 8 carried into engagement with the contact member 12. As soon as this contact is made we have the following electrical circuit: from the current source 63 through conductor 64, arm 8, contact point 11, contact member 12, conductor 65, electromagnet set 61 and conductor 66, to the other terminal of the source 63. The armature 60 will therefore be attracted toward the electro-magnet set 61 to the position shown in Fig. 5, and the resultant swing of the escapement frame will allow the escapement wheel 59' and valve plug to be rotated one-sixth of a revolution by the clock mechanism 54, and the passageway condition at the valve will be as shown in Fig. 7. With these valve conditions the flue gas inlet 25 will be connected through valve passageway 32 with the atmosphere outlet 30. Reservoir 1 will be connected through valve passageway 33 with the piping 35 leading to the reservoir 15, and the pipe 36 leading from the top of reservoir 16 will be connected through valve passageway 34 with piping 38 leading to the top of reservoir 17. Owing to the level of the liquid in reservoir 3 this liquid will tend to flow back into reservoir 1 and to force the gas therein through the valve and pipe 35 into the lower part of reservoir 15, which, as before stated, is filled with caustic potash. The gas bubbling up through this caustic potash solution is robbed of its carbon dioxid, which is absorbed by the solution. The remaining gas, however, flows upwardly through the bulb 16, which is filled with glass beads to prevent solution from being carried with the gas, and the gas flows through pipe 36, valve passageway 34 and pipe 38, into the top of reservoir 17 and the liquid in said reservoir is forced downwardly by the gas and flows into the reservoir 19 to cause the plunger 20 to be raised. After all the gas has been forced out of reservoir 1 and the float 4 has again reached its normal position, the arm 8 will have returned into engagement with contact member 10 to reclose the circuit through the electromagnet set 62, this circuit being traced from the current source 63 through conductor 64, arm 8, contact point 9, contact member 10, conductor 67, electromagnet set 62 and conductor 68, back to the current source. The armature 60 will therefore be attracted by the electro-magnet set 62 and the escapement frame swung to allow another one-sixth rotation of the escapement wheel and valve plug, whereupon the valve passageway conditions will be as shown in Fig. 1. The record sheet is divided by lines 69 into hours or other suitable periods of time and the circular lines 70 represent the percentage of residue or the percentage of carbon dioxid. As the float 20 is raised in the reservoir 19, the pulley 22 and the needle 39 are rotated. After all the gas has been driven from the reservoir 1 and the float 20 has reached its top-most position, the arm 8 will have been restored to engage the contact member 10 and the circuit just traced through electromagnet set 62, closed. This circuit also includes electro-magnet 49 and therefore as soon as the needle has reached the final posiion the electromagnet is energized and the needle point brought into engagement with the record sheet to mark said sheet, and the record sheet will therefore give the result of the analysis, the lines 69 indicating at what time the analysis was made and the circular lines indicating the chemical results, as for instance, the per cent. of carbon dioxid in the particular gas sample tested.

After the valve has been restored to the position shown in Fig. 1, another charge of flue gas enters the reservoir 1, while at the same time the liquid in reservoir 19 falls to its normal level and forces the gas out of the reservoir 17 through the pipe 38 and to atmosphere through the valve passageway which now connects the valve connecting ends 29 and 30. Pipings 35 and 36 are connected together through one of the various passageways and the pressure conditions in said piping and in said reservoirs can be equalized. By the time the float 4 again reaches the line A—A in reservoir 3 and the arm 8 is carried around into engagement with contact member 12, the gas will all have been driven from reservoir 17 and the measuring reservoir 19 is in condition for another measuring operation. The electro-magnet set 61 then again becomes effective and the valve rotated another one-sixth of a revolution to cut off the flue gas source and to connect the reservoir 1 with the measuring and analyzing mechanism, the caustic potash in the reservoir 15 absorbing the carbon dioxid and the residue reaching the reservoir 17 to force liquid into the measuring reservoir 19 and thereby cause another indication on the record sheet.

No manual adjusting or testing steps are necessary in our system, but all the parts are automatically controlled and the operation is caused to be continuous. The charges received by the receptacle 1 are of the same volume, being controlled by the float mechanism, which controls the circuit controlling mechanism for the valve actuating electromagnets. The results of the analysis of each charge will be represented by the position of a mark on the record chart, and after an extended test the chemical analysis can be plainly read from the chart. Our arrangement requires very little supervision as it is so automatic in its operation, all that is necessary to produce a correct analysis of the flue gas to be tested being to connect the flue gas with valve inlet 2 5.

We do not desire to be limited to the precise form and arrangement of the various parts which form a part of our system.

We desire to secure the following claims by Letters Patent:—

1. In a gas analyzing apparatus, the combination of a reservoir, normally filled with a liquid, a measuring mechanism connected with said reservoir, said liquid adapted to be forced into said measuring mechanism by the flow of gas into said reservoir, an analyzing device, a valve in its normal position connecting said reservoir with a source of gas supply and in its alternate position connecting said reservoir with said analyzing device, and actuating means for said valve, said actuating means adapted to move said valve from its normal to its alternate position when a predetermined volume of liquid has been forced from said reservoir into said measuring mechanism, thereby establishing connection for said gas with said analyzing device, and causing said liquid to resume its normal position in said reservoir.

2. In a gas analyzing apparatus, the combination of a reservoir, normally filled with a liquid, a measuring mechanism connected with said reservoir, said liquid adapted to be forced into said measuring mechanism by the flow of gas into said reservoir, an analyzing device, a valve in its normal position connecting said reservoir with a source of gas supply and in its alternate position connecting said reservoir with said analyzing device, actuating means for said valve, said actuating means adapted to move said valve from its normal to its alternate position when a predetermined volume of liquid has been forced from said reservoir into said measuring mechanism, thereby establishing connection for said gas with said analyzing device and causing said liquid to resume its normal position in said reservoir, and additional actuating means for said valve, said additional means adapted to move said valve from its alternate to its normal position when said liquid has resumed its normal position in said reservoir.

3. In a gas analyzing apparatus, the combination of a reservoir for receiving a charge of gas to be analyzed, an analyzing device, a valve in its normal position adapted to connect said reservoir with a source of gas supply and in its alternate position to connect said reservoir with said analyzing device, and an automatic device for moving said valve from its normal to its alternate position, said device actuated by the fluid displaced from said reservoir on the reception of a predetermined amount of gas, said gas thereby being discharged from said reservoir into said analyzing device.

4. In a gas analyzing apparatus, the combination of a reservoir normally containing fluid, an analyzing device, a valve in its normal position adapted to connect said reservoir with a source of gas supply and in its alternate position to connect said reservoir with said analyzing device, an over-flow receptacle associated with said reservoir for receiving the fluid forced from said reservoir by the entrance of gas therein, and means actuated by the fluid in said over-flow receptacle for automatically operating said valve from its normal to its alternate position when a predetermined amount of fluid has been so received.

5. In a gas analyzing apparatus, the combination of a receptacle containing a liquid adapted to absorb a specified gas from a gaseous mixture to be analyzed, means for forcing a predetermined volume of said gaseous mixture through the liquid in said receptacle, a second receptacle normally filled with liquid, means for conducting the residue gaseous mixture from said first receptacle into said second receptacle, thereby forcing the liquid from said second receptacle, and measuring means controlled by the liquid flowing from said second receptacle, said measuring means serving to indicate the proportion of the residue gaseous mixture and thereby the proportion of the gas retained in the first receptacle.

6. In a gas analyzing apparatus, the combination of a receptacle filled with a reagent adapted to absorb a specified gas for which analysis of a gaseous mixture is to be made, means for forcing through the reagent in said receptacle a predetermined volume of said gaseous mixture, a second receptacle normally filled with liquid, means connecting the top of said second receptacle with said first receptacle, and an indicating mechanism adapted to be controlled by the overflow of liquid from said second receptacle.

7. In a gas analyzing apparatus, the combination of a reservoir for receiving charges of gas to be analyzed, an analyzing device, a valve adapted in its normal position to connect said reservoir with the source of gas supply and in its alternate position to disconnect said reservoir from said source and to connect said reservoir with said analyzing device, an electromagnetic actuating mechanism for said valve, circuits for said electromagnetic mechanism, and a switch mechanism adapted to close one of said circuits and thereby to move said valve to its alternate position when said reservoir has received a predetermined amount of gas and to close a second of said circuits when said gas has been discharged from said reservoir into said analyzing device, thereby returning said valve to its normal position.

8. In a device of the class described, the combination with a receptacle normally filled with liquid, of a source for supplying gas to be analyzed to said receptacle, an analyzing device, a valve, in its normal position connecting said receptacle with said source of gas and in its alternate position connecting said receptacle with said analyzing device, an electromagnetic mechanism actuating said valve by a step by step advancement from normal to alternate and alternate to normal position, circuits associated with said electromagnetic mechanism, and a switch adapted to close one of said circuits when a predetermined amount of gas has been supplied to said receptacle and to close the other of said circuits when said gas has been discharged from said receptacle to said analyzing device.

9. In a gas analyzing system, the combination of means for measuring out predetermined amounts of gas to be analyzed, an analyzing device, electric means controlled by said measuring mechanism for automatically causing the discharge of each measured amount to said analyzing device, and indicating means automatically controlled by the operation of the analyzing device to indicate the analysis.

10. In a device of the class described, the combination with a reservoir normally filled with fluid, of a source for supplying gas to said reservoir, an over-flow receptacle associated with said reservoir, a fluid in said receptacle, an analyzing device, a valve in its normal position adapted to connect said reservoir with said source of gas and in its alternate position to connect said receptacle with said analyzing device, an electromagnetic mechanism for actuating said valve by a step by step advancement from its normal to its alternate position and vice versa, circuits associated with said mechanism, a float adapted to be raised and lowered by the fluid in said over-flow receptacle, and a switch mechanism associated with said float, said float in its normal powered position adapted to cause said switch to close the circuit by which said valve is brought to its normal position and in its alternate raised position adapted to cause said switch to close the circuit by which said valve is brought in its alternate position.

11. In a device of the class described, a receptacle containing a reagent adapted to absorb a specified gas from a gaseous mixture to be analyzed, a second receptacle normally filled with fluid and connected for the passage of gas with said first receptacle, means for forcing a predetermined volume of said gaseous mixture through said receptacle, a third receptacle to receive over-flow liquid from said second receptacle, a float in said third receptacle, and an indicating apparatus actuated by said float, said apparatus adapted to show the percentage of gas absorbed from said gaseous mixture in said first receptacle.

In witness whereof, we hereunto subscribe our names this second day of November A. D. 1908.

KENT W. BARTLETT.
JUDSON J. STALEY.

Witnesses:
JACKSON REUTER,
SALLY LOEHRER.